United States Patent

[11] 3,562,414

| [72] | Inventor | Asher S. Blum<br>St. Louis, Mo. |
|---|---|---|
| [21] | Appl. No. | 856,855 |
| [22] | Filed | Sept. 10, 1969 |
| [45] | Patented | Feb. 9, 1971 |
| [73] | Assignee | Zenith Radio Corporation<br>Chicago, Ill.<br>a corporation of Delaware<br>Continuation of application Ser. No.<br>603,543, Dec. 21, 1966. |

[54] SOLID-STATE IMAGE DISPLAY DEVICE WITH ACOUSTIC SCANNING OF STRAIN-RESPONSIVE SEMICONDUCTOR
2 Claims, 5 Drawing Figs.

[52] U.S. Cl. .................................................. 178/5.4,
178/7.3; 332/7.51; 317/235; 350/160, 350/161
250/226, 250/229
[51] Int. Cl. ............................................. H04n 5/38,
H04n 5/44, H04n 3/16
[50] Field of Search ....................................... 250/229,
226; 317/235/26; 332/2, 3, 7.51; 350/160, 161;
178/5.4, 7.3

[56] References Cited
UNITED STATES PATENTS

| 3,333,135 | 7/1967 | Galginaitis | 313/108 |
|---|---|---|---|
| 3,350,506 | 10/1967 | Chernow | 178/7.3 |
| 3,388,334 | 6/1968 | Adler | 330/5.5 |
| 3,277,339 | 11/1966 | Cainey | 315/160 |
| 3,183,359 | 5/1965 | White | 250/199 |
| 3,387,230 | 6/1968 | Marinace | 332/7.51 |
| 3,331,036 | 7/1967 | Colbow | 332/7.51 |
| 3,343,002 | 6/1967 | Ragland | 307/88.5 |
| 3,325,743 | 6/1967 | Blum | 330/5.5 |
| 3,334,307 | 8/1967 | Blum | 330/5.5 |
| 3,387,230 | 6/1968 | Marinace | 332/7.51 |
| 3,025,763 | 3/1962 | Schwartz et al. | 88/61 |
| 3,353,896 | 11/1967 | Blattner | 350/160 |
| 3,271,578 | 9/1966 | Bockenmuehl | 350/160 |

Primary Examiner—John W. Huckert
Assistant Examiner—B. Estrin
Attorneys—Francis W. Cratly and Hugh H. Drake ABSTRACT: A solid state television-type image display device includes a panel of strain-responsive semiconductor material whose absorption edge in the unstrained condition is at a first predetermined wavelength, but in response to strain the absorption edge moves to a second predetermined wavelength shorter than the first. Transducer means are provided for repetitively scanning the panel with acoustic energy of a magnitude sufficient to cause movement of the absorption edge, and an intensity modulated source of light of a wavelength equal to the first predetermined wavelength is placed in registration with the panel and is intensity modulated with gray scale information. In another embodiment, three such display devices are stacked in registration with each other in order of decreasing absorption edge wavelength, to provide for full color image production.

Inventor
Asher S. Blum

By *Hugh D. Drake*
Attorney

Inventor
Asher S. Blum

By Hughs D. Drake
Attorney

SOLID-STATE IMAGE DISPLAY DEVICE WITH ACOUSTIC SCANNING OF STRAIN-RESPONSIVE SEMICONDUCTOR

This application is a continuation of 603,543 filed Dec. 21, 1966, now abandoned.

This invention pertains to solid-state light eduction apparatus. More specifically, it relates to a system utilizing acoustoelectric techniques for controlling educed light as when developing an image. While such an image may be displayed in either visible or invisible light, for convenience the apparatus will be described herein as applied to the case of visible light image display.

Conventional image display systems as used in television receivers, for example, utilize a cathode-ray tube to produce light and reproduce pictorial information. However, such tubes occupy a large volume and are cumbersome, especially in view of the rapid advances being made in the field of integrated circuitry. The cathode-ray tube has become the biggest obstacle to reducing the size of the receiver for a given size display. Similar difficulties arise in the case of a variety of light eduction devices such as image amplifiers and converters, computer displays and light devices operating in either the visible or invisible wavelength regions.

Numerous proposals have been advanced for resolution of these problems, including devices taking advantage of such mechanisms as electroluminescence, injection luminescence, holography and magnetic stripe domains. While some of these approaches have yielded a degree of success in limited applications, none have found wide-spread success and each exhibits one or more seemingly inherent drawbacks.

It is, accordingly, a general object of the present invention to provide a light eduction system which overcomes problems attendant to the aforenoted devices.

It is a more specific object of the present invention to provide an acoustoelectric solid-state image display device.

It is another object of the present invention to provide an acoustoelectric solid-state image display device which controls the eduction of light in a manner involving the use of elements comparatively simple in themselves.

It is a further object of the present invention to provide an acoustoelectric solid-state multicolor image display device.

A solid-state image display device constructed in accordance with the present invention includes an image display panel of strain-responsive semiconductor material having an absorption edge at a first predetermined wavelength when in an unstrained condition. Transducer means are provided for repetitively scanning the panel in a raster pattern with acoustic energy of a magnitude sufficient to cause the absorption edge at the scanning spot to momentarily shift to a second predetermined wavelength shorter than the first predetermined wavelength. An intensity modulated source of light of a wavelength equal to the first predetermined wavelength is provided in registration with the image display panel.

The features of the present invention which are believed to be novel are set forth with particularity in the appended claims. The invention, together with further objects and advantages thereof, may best be understood, however, by reference to the following description taken in connection with the accompanying drawings in the several FIGS. of which like reference numerals indicate like elements and in which:

Figure 4:
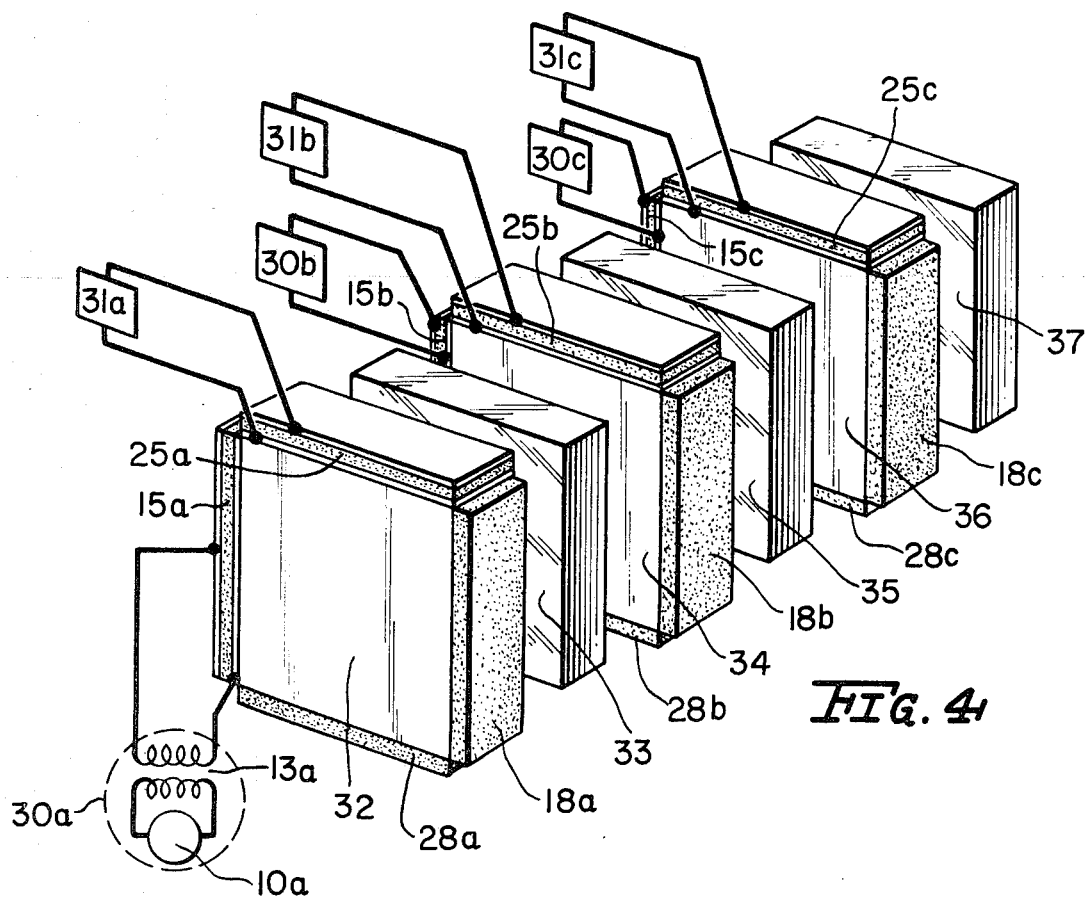
Figure 5:
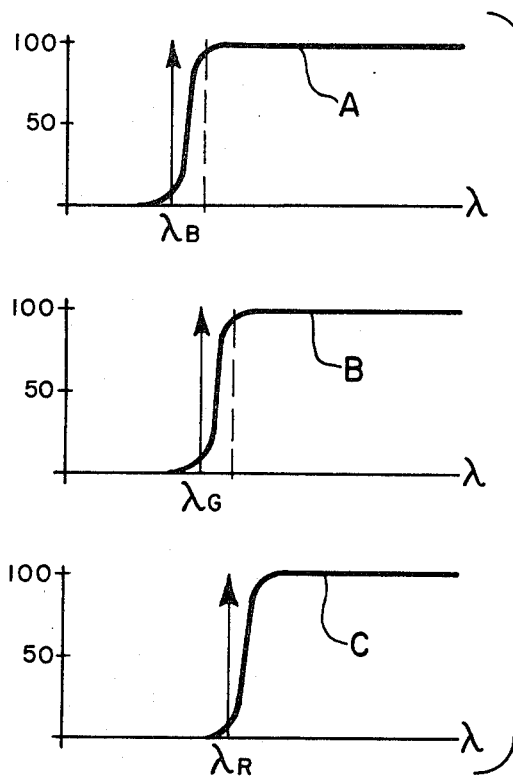

FIG. 4 is a partly schematic perspective view of an embodiment of a multicolor display system; and FIG. 5 is a series of plots of optical absorption characteristics of elements in the system of FIG. 4. In matter, electrons can be thought of as either being free, that is, in the conduction energy band, or constrained by the atomic lattice of the material, that is, in the valance energy band. Different materials have different energy gaps between their associated valence and conduction bands. One possible source of the necessary energy to raise an electron from the constrained to the free state is the photon energy of light waves. When a photon carries the requisite amount of energy, an electron is excited by that energy from the valence band to the conduction band and the photon itself is absorbed. With such absorption, less than all of the incident light, or perhaps no light whatsoever, passes through the material. On the other hand, when the amount of energy carried by the photon is not sufficient to raise the energy level of the constrained electron, the photon passes through the material.

The gap between the energy bands may be altered by imposing a mechanical strain upon the material. When the mechanical strain is such that the electron band gap is increased, the photons whose energies were in the vicinity of the band gap of the unstrained material are no longer absorbed; only photons having an associated energy higher by at least the amount of the band gap change are absorbed by the material. In other words, a certain number of photons that previously would not have passed through the material but would have been absorbed now move through the material unimpeded because their associated energy is now less than that required to excite an electron from the valence band to the conduction band. Also, different materials act as filters for different wavelengths of radiation under given conditions of strain because their absorption edges occur at different wavelengths.

Figure 1:
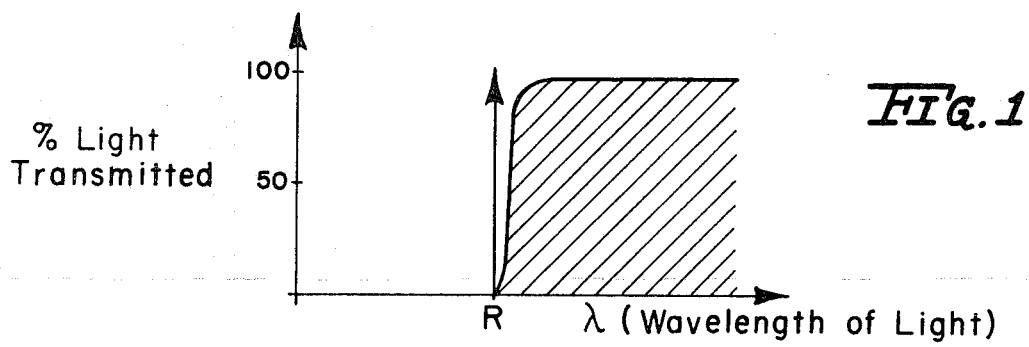
FIG. 1 is a plot of the optical absorption curve of a particular material.

FIG. 1 depicts the percentage of light transmitted by a particular material as a function of the wavelength of the light illuminating the material. The shaded portion of the plot indicates transmitted light while the unshaded area represents untransmitted light. The boundary which separates the shaded region from the unshaded region is known as the absorption edge. In this particular case, light of the wavelength R, called the "low edge" wavelength for convenience, is not transmitted by this material, but light of wavelengths greater than R is transmitted in the amount shown.

Figure 2:
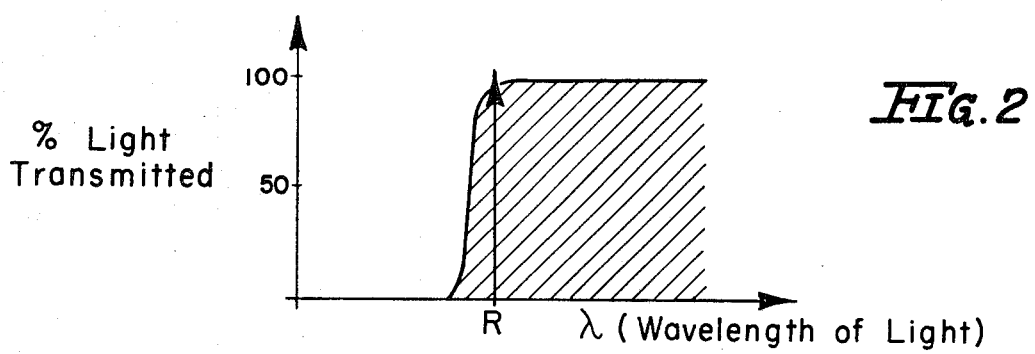
FIG. 2 is a plot of the optical absorption curve of the material of FIG. 1 when it is subjected to an extensional strain.

In FIG. 2, the absorption edge of the material is depicted at a wavelength less than R; that is, light of the wavelength R passes through this material and is essentially not absorbed. (Few, if any, materials exhibit 100 percent transmission even well above the absorption edge, but the change of transmission at the absorption edge in most filter materials is a significant percentage). The material is the same for both FIGS. 1 and 2, but the absorption curve has been shifted in FIG. 2 by applying an extensional strain to the material. This shift corresponds to a change in the electron band gap within the material. A stress of $3 \times 10^4$ kg./cm.$^2$ applied to GaP, for example, produces a strain which shifts the electron energy band gap sufficiently to allow light of a wavelength shorter than was previously transmittable to pass through the material. Of course, numerous solid filter materials are known, individually having absorption areas nominally occurring at wavelengths throughout the visible spectrum. When placed under strain, all exhibit a degree of change of the absorption edge wavelength, although in some the amount of change obtainable is very small. In any case, the maximum amount of change is limited by the point at which the material fractures under the applied mechanical strain. Moreover, another fixed filter may be placed in front of the strain-sensitive filter. The fixed filter is chosen to be selective of the light only at one of the strained or constrained conditions of the other filter. This approach may be used for example, to sharpen the selectivity or narrow the bandwidth of the light translated.

Figure 3:
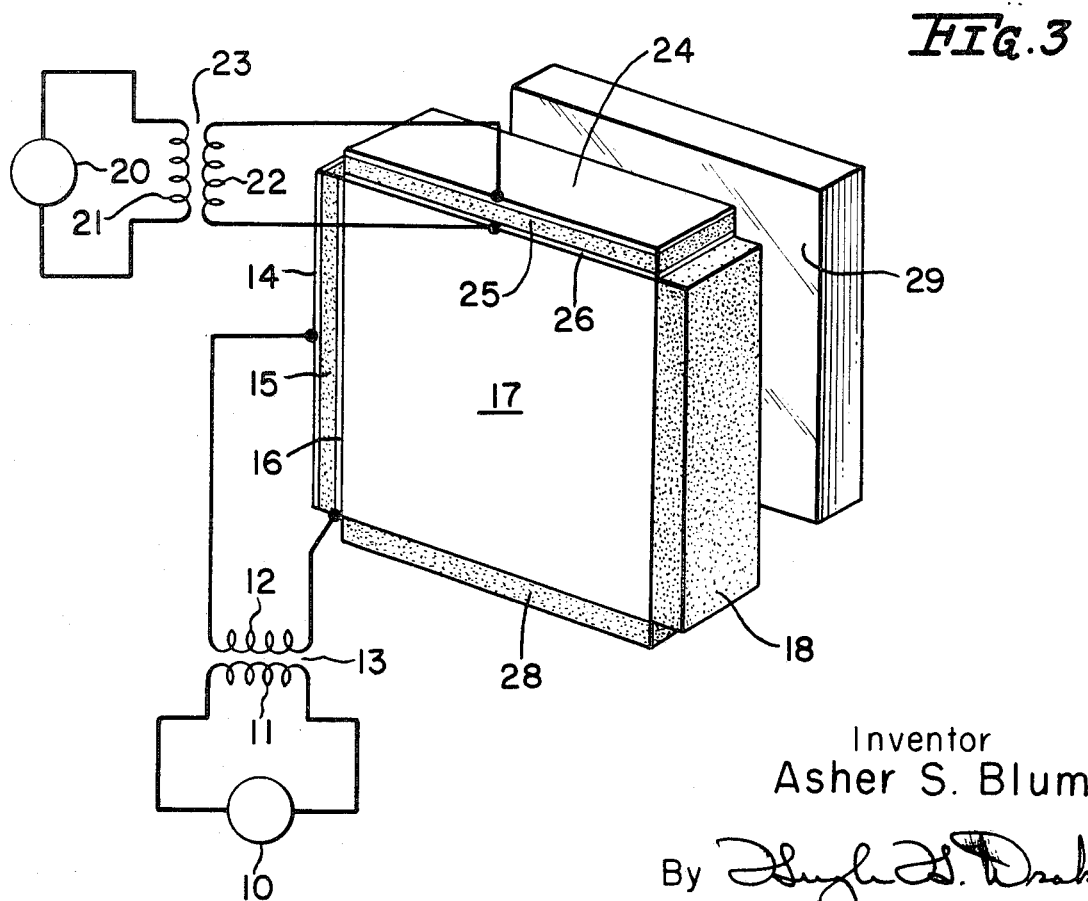
FIG. 3 is a partly schematic perspective view of an embodiment of an acoustoelectric solid-state image display system.

To impart strain to the filter material, and thus achieve strain-variable light selectivity, a transducer is coupled to the material. In FIG. 3, a pulse generator 10 is connected across the primary winding 11 of a transformer 13. The secondary winding 12 of transformer 13 is in turn coupled across a piezoelectric transducer 15 constructed of quartz. The transducer electrodes are a gold layer 14 on one transverse surface of transducer 15 and a layer of indium 16 on the opposed surface which also bonds transducer 15 to one of the minor rectangular surfaces of a square slab 17 of filter material. An acoustic termination 18 is positioned on the opposed minor rectangular surface of slab 17.

In a similar manner, a pulse generator 20 is coupled across a transducer 25 by means of a transformer 23 made up of a primary winding 21 and a secondary winding 22. As before, the transducer electrodes are a highly conductive layer 24 on one surface and a conductive bonding layer 26 on the opposed surface. Transducer 25 is affixed to one of the two remaining rectangular minor surfaces of slab 17. An acoustic termination 28 is bonded to the one remaining minor rectangular surface on slab 17.

Completing the assembly is a source 29 of essentially monochromatic light. Source 29 preferably is a laser system which illuminates the surface of one major rectangular face of slab 17 with light. To enable equal illumination over the entire surface, the laser system may include a plurality of optically transmissive fibers which form a tight bundle at one end receptive to the laser beam and then spread uniformly apart to distribute the light over the broader area. Alternatively, the laser beam may be spread out by the use of conventional lens optics. As still another alternative, source 29 may be an array of PN junction lasers.

In operation, a pulse from source 10 is fed to transducer 15 which produces an acoustic strain wave in the material of slab 17 that travels outward from the transducer until it reaches termination 18 where it is absorbed and not reflected. Similarly, a pulse signal from source 20 is fed to transducer 25 which induces an acoustic strain wave in the slab 17 traveling at right angles to the acoustic pulse produced by transducer 15. The acoustic pulse produced by transducer 25 is absorbed by termination 28. At the same time, light source 29 illuminates the rear face of slab 17.

The maximum mechanical strain occurs at the intersection of the two acoustic waves produced respectively by transducers 15 and 25. The pulse applied to each of the input transducers has an amplitude of one-half the electrical signal strength necessary to produce a corresponding mechanical strain in slab 17 of a magnitude sufficient to move the absorption edge from the condition of FIG. 1 to that of FIG. 2. Consequently, light from source 29 passes through and emerges from the front face of slab 17 at the intersection of the two acoustic waves. No light is displayed at any other point on the front face because the intensity of but one of the strain waves is insufficient to move the absorption edge by the amount necessary to pass the light. While in this example, the strength of both the individual signal sources is one-half that necessary for light transmission, that equality of value is not required and one may be stronger than the other. The preferred condition is that neither signal source individually has the strength necessary to effect light transmission, but that the two sources together have such combined strength as to cause light transmission where the respective acoustic waves coincide.

To enable scanning of the wave-intersection point over the front face of slab 17, and thus to define an image raster or to selectively define only a limited area of light display, sources 10 and 20 include conventional timing circuits for energizing one source in timed relation to the energization of the other. The intensity of the light from source 29 is modulated with the video information.

Other methods of developing the strain waves may be used. Although the illustrated embodiment contemplates pulse excitation, other types of signals may be advantageous in different applications; for example, one source may feed a continuous signal when only a one-directional display variation is to be depicted. By making slab 17 itself of a piezoelectric filter material, electrodes directly affixed to the slab surface may be used to produce the mechanical strain waves.

To enable multicolor reproduction, a plurality of variable-selectivity filters, individually different in absorption edge wavelength, are utilized. In FIG. 4, a signal source 10a and a transformer 13a constitute a pulse excitation system 30a. System 30a is coupled across a transducer 15a which, in turn, is affixed to the minor rectangular surface of a square slab 32 of filter material. An acoustic termination element 18a is affixed to the opposed minor rectangular surface. In a similar manner, an excitation system 31a is coupled across a transducer 25a bonded to one of the remaining minor rectangular surfaces of slab 32, and an acoustic termination 28a is positioned on the remaining minor rectangular surface of slab 32. Located behind material 32 is a transparent light source 33.

Positioned behind source 33 is square slab 34 of another filter material and upon corresponding minor rectangular surfaces of which are transducers 15b and 25b coupled respectively to excitation systems 30b and 31b. Termination elements 18b and 28b are located on the opposed minor rectangular surfaces of slab 34. Behind slab 34 is a transparent light source 35. Behind source 35 is still another slab 36 of filter material upon corresponding minor rectangular surfaces which are transducers 15c, 15c and termination elements 18c and 28c. A pulse excitation system 31c is coupled to transducer 25c and a pulse excitation system 30c is coupled to transducer 15c. Finally, behind slab 36 is a light source 37.

Light sources 33, 35 and 37 are chosen to produce light of a wavelength at or very near the wavelength of the "low edge" of the absorption curves of the material behind which the respective source is directly situated. These "low edge" wavelengths of slabs 32, 34 and 36 are individually different. Moreover, the slabs and sources are arranged in sequence so that light produced by rearmost source 37 and passing through the rearmost slab 36 has a wavelength well within the pass band of slabs 32 and 34 which are in front of slab 36. Similarly, light which is produced by source 35 and passes through slab 34 is of a wavelength such that it also passes without substantial attenuation through slab 32.

In order to facilitate an understanding of the selection of proper "stacking" order, it is useful to consider the curves depicted in FIG. 5. Each of the lots, lettered A, B and C respectively, represents an absorption curve of a different strain-sensitive material. In curve A, the low-edge wavelength is $\lambda_B$, the wavelength of light in the blue range. In curve B, the low-edge wavelength is $\lambda_G$ corresponding to green light, and in curve C, the equivalent wavelength is $\lambda_R$ for red light. As previously noted, the result of a sufficient extensional strain on any of these materials is to shift the absorption edge so as to allow transmission of the low-edge wavelength. Moreover, the material exhibiting curve A passes light of wavelengths $\lambda_G$ and $\lambda_R$ whether under strain or not and the material of curve B passes light of wavelength $\lambda_R$ in either condition. The material of slab 32 is thus selected to exhibit curve A, while the materials of slabs 34 and 36 are selected to exhibit curves B and C, respectively.

In operation, each of the individual filter slabs in the sandwich-type display panel of FIG. 4 operates in the same manner as the single display panel depicted in FIG. 3. More specifically, electrical pulses produced by the excitation systems 30a and 31a produce two acoustic waves in slab 32 traveling at right angles. The sum of the stresses that they produce at their intersection is such as to allow light of the wavelength produced by source 33 to pass through slab 32. Similarly, slab 34 is transparent to light from source 35 at the intersection of the acoustic waves produced by pulses from systems 30b and 31b. Finally, slab 36 is permissive to the transmission of light from source 37 at the intersection of the acoustic waves produced by systems 30c and 31c. Termination elements 18a, 18b and 18c as well as termination elements 28a, 28b and 28c prevent backward reflection of the acoustic waves which otherwise could produce additional light spots.

The scanning of each of the three slabs is correlated so that the resulting three images, one of each color, coalesce in manner analogous to the convergence of the three electron beams in a tricolor cathode-ray image reproducer. The combined images appear as one on the front face of slab 32.

As specifically disclosed and as the preferred embodiment, the absorption edge of the filter is shifted, by inducing strain in the material in order to gate the translation of light through a particular region of the filter material. The technique is also applicable to strain control selectively of light generated within the material itself. It is further contemplated to utilize the same technique of acoustic-wave strain inducement to modify selectively the reflection of light cast upon a filter material surface. A filter composed of alternate layers of material of different dielectric constants, such as a dielectric mirror may be used to transmit light selectively when subjected to strain in the manner herein described; inversely, portions of the light not transmitted are reflected. In a broader sense, the basic contemplation is that of strain-responsive control of the light transmission of or generation by a medium in order to effect control of photons educted from a surface of that material.

The disclosed apparatus affords a solid-state image-display system which has substantial advantages over predecessor devices. Specifically, it is suitable for either color or monochrome reproduction, high currents or voltages and their attendant switching and arcing problems are avoided, high vacuums are eliminated, and the resultant package has a convenient form factor enabling, for example, the construction of a mural television display. Furthermore, it is worthy of note that the disclosed optical absorption techniques may be used in combination with the strain-controlled lasing system disclosed in the copending application of Asher Blum, Ser. No. 611,743, filed Jan. 25, 1967 and assigned to the same assignee as the present invention. Moreover, that system represents a species of the present invention considered in its broader aspects.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of the invention.

I claim:

1. A solid-state image-display device comprising:

an image-display panel of strain-responsive semiconductor material having an absorption edge at a first predetermined wavelength when in an unstrained condition;

transducer means for repetitively scanning said panel in a raster pattern with acoustic energy of a magnitude sufficient to cause the absorption edge at the scanning spot to momentarily shift to a second predetermined wavelength shorter than the first predetermined wavelength; and an intensity modulated source of light of a wavelength equal to said first predetermined wavelength in registration with said panel.

2. In combination, at least three display devices each as set forth in claim 1, having absorption edges of different wavelengths and stacked together in registration in order of decreasing absorption edge wavelength.